United States Patent Office 3,481,425
Patented Dec. 2, 1969

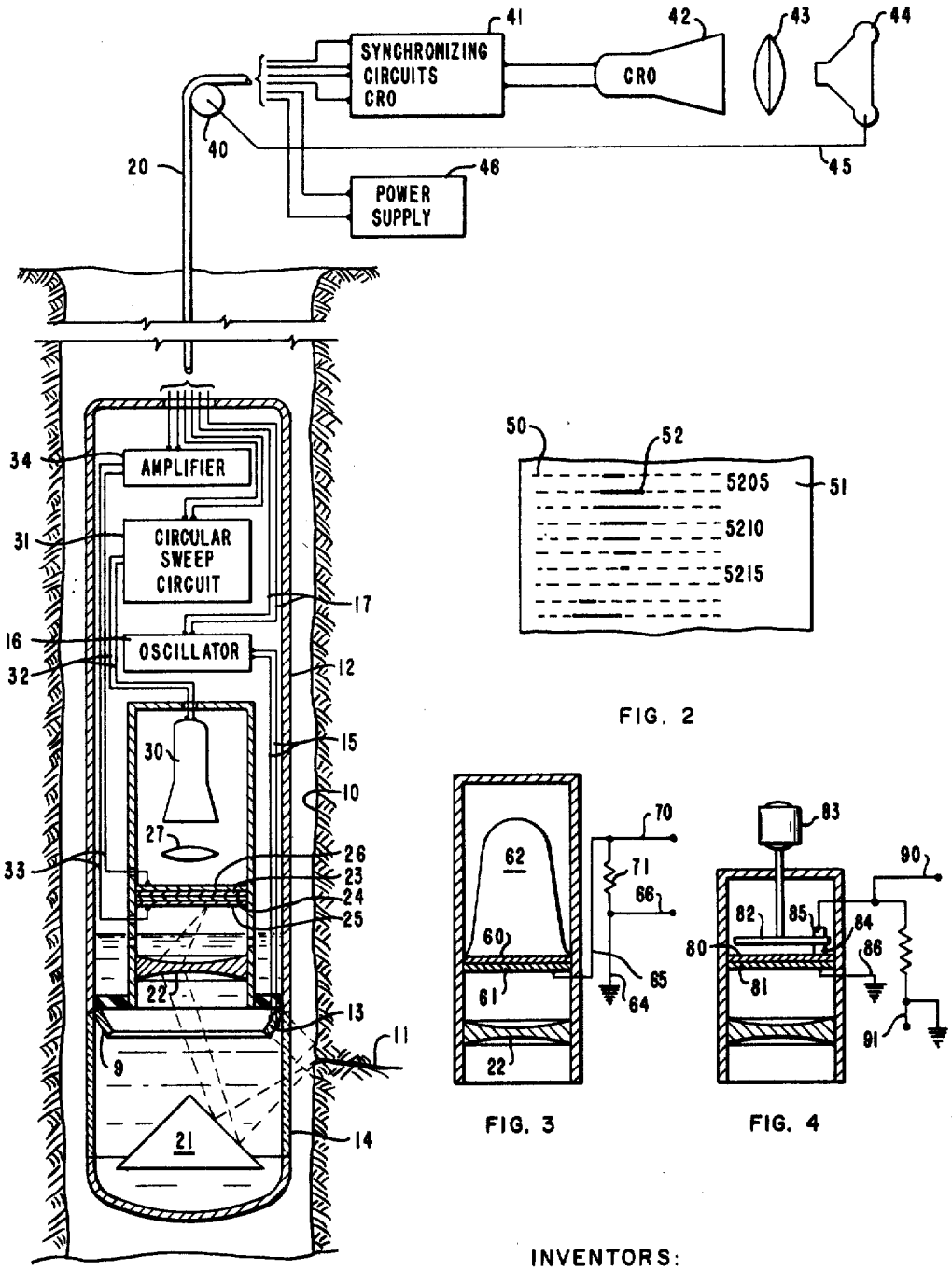

3,481,425
APPARATUS AND METHOD USING ULTRASONIC RADIATION FOR MAPPING THE WALL OF A BOREHOLE
Noyes D. Smith, Jr., Bellaire, and Charles B. Vogel, Houston, Tex., assignors to Shell Oil Company, New York, N.Y., a corporation of Delaware
Filed June 26, 1967, Ser. No. 648,700
Int. Cl. G10k *11/00;* G01v *1/00, 1/40*
U.S. Cl. 181—.5         5 Claims

ABSTRACT OF THE DISCLOSURE

A system utilizing ultrasonic radiation to map the wall of a tubular member to indicate the size and disposition of flaws and other irregularities in the surface of the tubular member. The surface is irradiated and the scattered radiation is received and converted to an analog pattern of electric charges that indicate the size and disposition of the flaws and other irregularities. The pattern of electrical charges is recorded in a form preserving both the size and disposition of charges to obtain a map of the surface of the tubular member.

---

This invention pertains to well logging and more particularly to an apparatus utilizing ultrasonic radiation to map the wall of the borehole, or other tubular member, by indicating, in respect to well logging, the size and disposition of the rocks or flaws that are encountered along a small section, such as a one-inch section, of the borehole wall.

Many attempts have been made to obtain an accurate indication of the rocks that form the wall of a borehole, particularly in respect to boreholes that were drilled in an attempt to recover petroleum from underground deposits. Such attempts have utilized various photographic instruments designed to photograph the wall of the borehole. Also, various types of television systems have been built in an attempt to transmit pictures of the borehole wall. While such pictorial methods have some success, they are seriously limited by the light-transmission properties of the fluids in the boreholes. In the case of boreholes that are filled with relatively clear water, relatively clear pictures can be obtained while, in the case of boreholes that are filled with crude oil or drilling mud, it is unfeasibly difficult to obtain a usable visual image.

Other types of logging devices have been designed in an attempt to determine the characteristics of the surface of the borehole wall. Such attempts have included uses of electrical logging means that were designed to traverse or scan the borehole wall while responding to the electrical properties of the formations surrounding the borehole. Acoustical logging methods have been designed to obtain information regarding the certain acoustic properties of the formations surrounding the borehole. While these methods have provided some information, i.e., the electrical resistivities or conductivities, the acoustic velocities or attenuation properties or the distances to acoustic energy reflecting discontinuities, concerning the characteristics of the formation around the borehole, they have not supplied detailed information regarding the size and distribution of the rock components that form the surface of the borehole.

In addition to the above methods, attempts have also been made to obtain impressions of the borehole wall to ascertain its topographical characteristics. For example, deformable material such as moldable plastic or metals such as lead have been lowered into the borehole and pressed against the borehole wall to obtain an impression of the borehole wall. While these methods provide a replica of the exposed surface of the borehole wall, they are very time consuming, especially if any great length of the borehole is mapped and, if a granular surface is coated with a mud cake, the impression shows only the cake surface rather than the granular surface.

Information concerning the features and characteristics of the borehole wall is desirable in the case of boreholes that are drilled to recover petroleum deposits. For example, it is desirable to know the locations and distributions of small discontinuities such as grain boundaries and formation interfaces within the various types of formations that surround a borehole. This information can then be utilized to locate and evaluate fluid-producing formations. Likewise, it is desirable to know the location and position of fractures that occur in the formations surrounding the borehole. This information is especially desirable after a formation has been artificially fractured, to ascertain if the fracturing operation was successful and whether the fractures have a predominant common alignment.

Apparatus for similarly mapping the wall of substantially any type of a tubular member is also useful in inspecting tubular members. For example, in the case of producing wells it is desirable to know the condition of the casing that isolates the various formations penetrated by the borehole. This information can be used to determine the presence of any pits or scratches on the inner or outer surface of the casing and thus to determine the success of various methods that are used to reduce or eliminate the abrasion or corrosion of the well casing.

The above problems are solved by this invention by providing a logging tool which may be lowered into a borehole and operated to obtain and transmit acoustical information suitable for mapping the wall of the borehole. In accordance with this invention, the downhole tool preferably contains a transducer assembly disposed to generate a beam of ultrasonic radiation and direct it at an angle against a major segment of the surrounding conduit or borehole wall. The ultrasonic radiation is scattered and reflected by the various discontinuities that are encountered on or near the surface of the borehole wall. Disposed adjacent to the generator transducer is an acoustic receiver, lens, and conical mirror combination that is arranged to be selectively responsive to the scattered ultrasonic radiation. The conical mirror is so positioned that it reflects onto the lens primarily only the scattered radiation that emanates from the portion of the borehole wall that is irradiated by the transducer. Such a positioning causes the mirror to discriminate against reflected and refracted radiation. The lens images the so-scattered acoustic energy onto a receiving medium that contains an electrically responsive surface layer, such as a ferroelectric or piezo-electric plate or ring. The energy thus focused on the plate causes the production of a pattern of charges on the plate which is related to the pattern of the intensities of the imaged scattered radiation. In such a pattern the amplitudes of the charges are related to the magnitudes of the acoustic energy scattered from discrete portions of the borehole wall. The locations of such charges are related to the locations on the surface of the borehole wall from which the acoustic energy is scattered into the line of sight of the mirror. The plate on which the charges are formed is then electronically scanned to produce electrical signals representing the locations and magnitudes of the charges on the plate. These electrical signals are transmitted to a surface location. At the surface location the information contained in the electrical signal is indicated, displayed, and/or recorded to form a map of the acoustic scattering properties of the borehole wall. For example, in one embodiment of the invention, the horizontal sweep or X axis of a surface-located oscilloscope is controlled by a means used to scan along a circle on the plate while the brightness or Z axis of the oscilloscope is varied in relation to the magnitude of the charges encountered during the scan. To form a permanent record, the screen of such an oscilloscope is photographed. The film advance of the camera is synchronized with the advance of the downhole tool within the borehole in order to record a map of a wall section longer than the thickness of the individual portions viewed on the mirror and scanned on the surface of the electrically responsive medium.

The above-described system of this invention will be more easily understood from the following detailed description of the preferred embodiment when taken in conjunction with the attached drawing in which:

FIGURE 1 is a block diagram of a logging system constructed according to this invention, FIGURE 2 is a sample strip of the film record of this invention showing the appearance of anomalies that occur in the borehole wall, FIGURE 3 is a partial view of the downhole tool showing an alternate system for scanning the receiver of FIGURE 1, and FIGURE 4 is a partial view of the downhole tool showing another alternate system for scanning the receiver of FIGURE 1.

Referring now to FIGURE 1, there is shown a borehole 10 having a logging tool or instrument 12 suspended therein. The borehole 10 penetrates various rock formations and includes an interface 11 between two distinctively different types of rock formations. While only one interface is shown, of course, numerous interfaces occur along the length of the borehole in addition to other features of interest. For example, the formations may contain either vertical or horizontal fractures or openings that contain petroleum deposits.

The logging tool 12 is suspended in the borehole from a logging cable 20. The logging cable 20, in addition to containing the necessary circuits for transmitting power to the logging tool and signals from the logging tool to the surface recording instruments, also includes sufficient mechanical strength to support the logging tool in the borehole. Various means are known to those skilled in the art for attaching the logging cable to borehole instruments and for designing instrument cases that are capable of withstanding pressures and temperatures that occur in boreholes. Accordingly, no description or illustration of these features is included.

The logging instrument 12 includes an annular transmitter transducer 13 with the active surface 9 of the transducer being inclined at an angle to the axis of the borehole. In addition, the transducer 13 should be capable of generating ultrasonic pressure waves when energized by a suitable electrical signal. Various types of materials are available for use in the transmitter transducer, for example, barium titanate, which is piezoelectric. Alternatively, the transmitter transducer may employ a magneto-strictive material such as sintered nickel-cobalt-ferrite. The transmitter transducer 13 is disposed in a position to irradiate the borehole wall with a circumferential band of ultrasonic radiation having substantially plane waves. When the ultrasonic radiation strikes the surface of the borehole wall, the waves will be reflected, refracted and scattered. This invention is directed specifically to the detection of the scattered radiation and is designed to discriminate against refracted or reflected radiation.

A conical-shaped acoustical mirror 21 is disposed below the transducer 13 and has its longitudinal axis aligned with respect to the axis of the transducer 13. The instrument case of the logging tool 12 is provided with an acoustical window 14 in order that the acoustical waves may travel from the transducer 13 outwards to the borehole wall 10 and be scattered inwardly to the acoustical mirror 21. The acoustical mirror 21 may be formed of various materials having a capability of reflecting acoustical waves, for example, stainless steel or glass. The mirror 21 is spaced longitudinally from the transducer 13, and its outer surface is inclined at an angle to reflect scattered radiation. The lower portion of the logging instrument is preferably filled with a liquid as for example an insulating oil or the like.

Aligned with and spaced from the acoustical mirror 21 is an acoustical lens 22 that is designed to focus the radiation reflected by the receiver mirror 21 onto a piezoelectric plate 24. The acoustical lens can be fabricated from plastic or metal and should be designed to focus the radiation on the piezoelectric plate 24. The choice of material and design of the lens depends upon the liquid used to fill the instrument and the frequency of the radiation. The combination of the acoustical mirror 21 and acoustical lens 22 produce an acoustical image on the piezoelectric plate 24 resulting from the acoustical waves that are scattered by the surface of the borehole 10. The acoustical image focused on the plate produces a pattern of electrical charges on the plate with the amplitudes of the charges being proportional to the intensity pattern of the scattered acoustical waves.

Various means are available for scanning the pattern of charges produced on the piezoelectric plate 24. One means that is suitable is to dispose the piezoelectric plate 24 in an evacuated tube and scan the image by means of an electron beam. Another means is shown in the attached figure in which the lower surface of the piezoelectric plate 24 adjacent the lens 22 is covered by a conductive film 25, for example, the piezoelectric plate 24 may be formed of quartz and a thin film of aluminum deposited thereon. The back or top side of the quartz plate 24 is covered with a photoconductive material 23. For example, a thin film of selenium or of cadmium sulfide may be deposited on the quartz plate 24. Finally, the back surface is covered by a transparent conductive layer 26. The transparent conductive layer may be formed of a thin film of gold, gallium or tin oxide deposited on top of the photoconductor.

The pattern of electrical charges on the quartz plate 24 may be scanned by various means, e.g., a light spot from a flying-spot scanner that impinges on the top surface of the quartz plate may be used. The light spot may be generated by means of a cathode ray tube 30 which is energized by a circular sweep circuit 31. The sweep circuit 31 should be designed to cause the cathode ray 30 to generate a circular sweep. The light spot from the sweep of the cathode ray tube 30 is focused by means of a lens 27 onto the quartz plate 24. The light spot from the cathode ray tube will then scan the quartz plate in a circular pattern and determine the location and magnitude of the various electrical charges on the quartz plate. When the light spot from the circular scanning means impinges on the quartz plate, it will cause an electrical pulse to appear between the two conducting plates 25 and 26. The two plates 25 and 26 are connected by means of conductors 33 to an amplifier 34. The amplifier 34 will amplify the electrical pulses and transmit them to the surface over the well logging cable 20. The circular sweep circuit 31 is also connected to the surface recording system by means of the well logging cable 20.

The surface recording system may consist of various types of devices for displaying the magnitude and pattern of the electrical pulses received from the quartz plate 24. One system utilizes a second cathode ray oscilloscope 42 and its associated synchronizing circuit 41. In addition, the synchronizing circuit 41 should be coupled to the circular sweep circuit 31 so that the display on the cathode ray oscilloscope 42 is synchronized with the scanning of the quartz plate 24. One method of accomplishing this result would be to control the X axis of the cathode ray oscilloscope by means of the circular sweep circuit 31. The Z axis of the cathode ray oscilloscope could then be controlled by the magnitude of the electrical pulses transmitted by the amplifier 34. In this manner for each complete scanning of the quartz plate 24 a single horizontal display or line will be provided on the cathode ray oscilloscope 42.

The display on the screen of the cathode ray oscilloscope 42 is photographed by means of a camera 44. The image on the screen of the oscilloscope is focused into the lens of the camera by means of an auxiliary lens 43. The film advance of the camera 44 is controlled by the depth of the tool in the well bore 10. This may be accomplished by providing a Selsyn unit 40 for measuring the length of the cable 20 suspended within the borehole and utilizing the movement of the Selsyn 40 to drive the film advance of the camera. The Selsyn 40 may be connected to the film advance by means of a lead 45. The apparatus in FIGURE 1 is completed by means of a power supply 46 which is located at the surface and supplies power both for the surface recording system and the downhole logging tool. The power may be transmitted to the downhole logging tool by means of conductors included within the well logging cable 20.

Shown in FIGURE 2 is a representative sample of the film record of the display on the screen of the oscilloscope 42. As seen in FIGURE 2, the film record consists of a series of horizontal images or lines 50 and a series of depth indications 51 at the right. The depth indications may be easily obtained by coupling the Selsyn unit 40 to a counting means and having the camera photograph the counting means at preset intervals. The display lines 50 of the film strip of FIGURE 2 are produced by beam-brightening signals of rather uniform moderate amplitude representing scattered waves of corresponding uniform amplitude, from moderately smooth portions of the borehole wall, except for the general area 52 which is produced by pulses that are obtained where the wall of the borehole 10 contains a fracture or a rough surfaced region. The rough-surfaced portion of the borehole would cause a larger portion of the acoustical waves to be scattered and thus increase the amplitude of the received scattered waves. The increased-amplitude of the scattered waves would then be converted to increased amplitude electrical pulses which would cause the sweep of the cathode ray oscilloscope 42 to be brightened to a greater degree.

When the above system is operated, the logging tool 10 is first lowered into the borehole by means of the logging cable 20. As the logging tool is lowered into the borehole the oscillator 16 will cause the transducer 13 to operate continuously or intermittently to generate high-frequency acoustical waves. As explained above, the transducer 13 is positioned and constructed so as to generate a circumferential band of acoustical energy that is directed radially outward to impinge upon the wall of the borehole 10. As the acoustical energy impinges upon the borehole wall, it will be scattered, refracted or reflected. The logging tool of this invention is designed primarily to respond to scattered radiation while discriminating against reflected or refracted radiation. The scattered radiation will be focused by means of a conical mirror 21 and an acoustical lens 22 onto the piezoelectric plate 24. The pattern of the scattered acoustical energy will cause a related pattern of electrical charges to appear on the plate 24. The position of electrical charges will be related to the position of the scattered waves while the magnitude of the charges will be related to the magnitude of the scattered waves. The plate is scanned to determine the location and magnitude of the charges with the information being transmitted to the surface where it is displayed on a cathode ray oscilloscope 42. The face of the oscilloscope is photographed to provide a record of the charges which indicates the characteristics of the borehole 10.

Referring now to FIGURE 3 there is shown an alternate means for receiving and transmitting the scattered ultrasonic radiation. The scattered radiation is directed by the mirror 21 of FIGURE 1 on a piezoelectric plate 60 that is provided with a conductive coating 61 on its lower surface. The scattered radiation that impinges on the piezoelectric plate 60 will generate a plurality of charges distributed in a pattern related to the distribution of the scattered radiation. The pattern of the distribution of the charges may be detected by a scanning means that will generate a circular sweep as described with relation to FIGURE 1. The scanning means may be by an electron beam from a cathode ray tube 62 which includes the upper surface of the quartz plate within its evacuated volume and is energized by a sweep circuit to generate a circular sweep. As the circular sweep scans the piezoelectric plate 60 the charges present on the top surface of the plate 60 will interact with the electron beam and produce a current related to the size of the charge in a resistor 71 connected to layer 61 by lead 65. The voltage across resistor 71 appears across leads 70 and 66 connected to the ends of the resistor. The circular sweep circuits in addition should generate a synchronizing pulse at the start of each sweep. The synchronizing pulse can be transmitted to the surface and used to synchronize the recording systems. Such acoustic cameras are described by C. N. Smyth in "The Ultrasound Camera—Recent Considerations," Ultrasonics, January 1966, pp. 15–19.

A third means for converting the pattern of charges distributed on the piezoelectric plate to related electrical pulses is shown in FIGURE 4. The piezoelectric plate 80 is provided with a conducting layer 81 on the bottom of the plate. The circular sweep utilizes a commutator plate 82 driven by a motor 83 and carrying a brush 84. The brush 84 detects the charges on the surface of the plate 80, and they are removed from the commutator 82 by a slip ring and brush assembly 85. The electrical signals are transmitted to the surface over the leads 90 and 91. The motor 83, in addition to driving the commutator, should generate a synchronizing pulse at the start of each sweep cycle. The synchronizing pulse can be used to synchronize the recording system shown in FIGURE 1.

While the invention has been described with relation to an uncased borehole, it can be used to obtain a map or log of the surface of the casing in a cased borehole. Likewise, the invention can be used to map the inner surface of any tubular member such as a pipeline or conduit. When the invention is used to map the inner surface of a borehole casing and the like, the record will display the location of pits and other corrosion. Thus, the invention is capable of mapping the wall of any tubular opening in which the tool may be placed.

While the use of a circular sweep has been described in the three examples of scanning the acoustic image, a spiral sweep or rectangular raster can be used to produce a map of a portion of the borehole wall for each frame similar to that obtained with a television camera.

A continuous source of acoustic energy has been described. A pulsed source may also be used with suitable gating to limit extraneous acoustic energy traveling by other than scattered paths from reaching the acoustic receiver during the period of the scan.

We claim as our invention:

1. A method for mapping the wall of a tubular opening comprising:

generating a series of ultrasonic waves at a first point in the tubular opening;

intercepting the ultrasonic waves that are scattered from the wall that surrounds the tubular opening at the point at which the waves were generated while preserving the circumferential distribution of the scattered ultrasonic waves and discriminating against reflected and refracted waves;

focusing the intercepted waves onto a receiving medium that contains an electrically responsive layer that is electrically responsive to the amplitude and disposition of acoustic energy that is focused onto its surface;

scanning said electrically responsive layer and generating an electrical signal related to the pattern of intensities and locations of the acoustic energy focused onto the surface of said layer;

transmitting said electrical signal to a surface location;

at said surface location, indicating the pattern of the intensities and locations of the scattered radiation in relation to the depth of the point at which said ultrasonic radiation was generated.

2. A system for mapping the wall of a tubular opening comprising:

a transducer, said transducer being disposed in the tubular opening to generate a circumferential band of ultrasonic radiation and direct the radiation radially outward toward the wall of the tubular opening;

an oscillator, said oscillator being coupled to said transducer;

an acoustical mirror and lens combination, said acoustical mirror being disposed to reflect the scattered radiation emanating from the portion of the surrounding wall toward which said radiation is directed while preserving the circumferential distribution of the scattered ultrasonic waves and discriminating against reflected and refracted radiation and said lens being disposed to focus the radiation reflected from said mirror;

a receiving medium, said receiving medium being spaced from said acoustical mirror and disposed in the path of said scattered radiation that is reflected by said acoustical mirror;

a scanning means, said scanning means being disposed to scan said receiving medium and generate a signal related to the position and intensity of the scattered radiation;

circuit means, said circuit means being coupled to said scanning means to transmit said signal to a surface location;

an indicating system at said surface location, said indicating system being coupled to said circuit means to indicate the locations and intensities of the scattered radiation in relation to the depth of said transducer in the tubular opening.

3. The system of claim 2 wherein said transducer is an annular transducer having an outer surface inclined at an angle to the axis of the borehole.

4. The system of claim 2 wherein said receiving medium contains a layer of an electro-sensitive material and said scanning means comprises an electron beam capable of interacting with the charged particles in the electrosensitive material.

5. The system of claim 4 wherein the surface recording system comprises an oscilloscope, the sweep of the horizontal axis being controlled by the circular sweep of the scanning means and the brightness being controlled by the intensity of the scattered radiation.

References Cited

UNITED STATES PATENTS

| | | | |
|---|---|---|---|
| 2,164,125 | 6/1939 | Sokoloff | 73—51 |
| 3,136,381 | 6/1964 | Anderson | 181—0.5 |
| 3,211,252 | 10/1965 | Smith et al. | 181—0.5 |

OTHER REFERENCES

Hueter et al., Sonics, 1955, John Wiley & Sons, New York, p. 265, 72–75.

BENJAMIN A. BORCHELT, Primary Examiner

JAMES FOX, Assistant Examiner

340—18